United States Patent [19]

Dean

[11] 3,806,184
[45] Apr. 23, 1974

[54] VEHICLE CHASSIS FRAME

[76] Inventor: Joe O. Dean, 5841 N.E. 22nd Ave., Fort Lauderdale, Fla. 33308

[22] Filed: Oct. 3, 1972

[21] Appl. No.: 294,678

[52] U.S. Cl.................... 296/35 R, 180/91, 293/1, 293/87
[51] Int. Cl. ....................B60r 21/00, B62d 27/06
[58] Field of Search............. 296/35 R, 28 K, 65 A; 180/91; 293/1, 30, 87

[56] References Cited
UNITED STATES PATENTS

| | | | |
|---|---|---|---|
| 1,141,248 | 6/1915 | Kadlec | 296/35 R |
| 3,508,783 | 4/1970 | Schlanger | 296/35 R |
| 2,446,609 | 8/1948 | Reed | 296/1 R X |
| 2,927,817 | 3/1960 | Raup | 296/35 R |
| 2,929,637 | 3/1960 | Papacosta | 296/65 A X |
| 3,162,479 | 12/1964 | Hewitt | 296/35 R |
| 3,589,466 | 6/1971 | Dudley | 296/35 R X |
| 3,695,629 | 10/1972 | Schlanger | 296/35 R X |

FOREIGN PATENTS OR APPLICATIONS

| | | | |
|---|---|---|---|
| 605,295 | 9/1960 | Canada | 296/35 R |

Primary Examiner—David Schonberg
Assistant Examiner—Leslie J. Paperner
Attorney, Agent, or Firm—James G. O'Boyle; Gardner J. O'Boyle

[57] ABSTRACT

A vehicle chassis frame having longitudinally extending, telescopic frame members, inclined portions formed on each end of said frame members, anti-friction rollers mounted on the inclined frame portions supporting similarly inclined frame portions secured to the vehicle body, and shear bolts connecting the vehicle body to the chassis frame.

8 Claims, 9 Drawing Figures

3,806,184

VEHICLE CHASSIS FRAME

BACKGROUND OF THE INVENTION

In the continuing research and development of safety features for vehicles, particularly automobiles, various devices and assemblies have been proposed to protect the vehicle occupants from injury resulting from collision.

One of the many proposed safety features includes the use of a telescopic chassis frame which is adapted to telescope on impact to absorb the energy therefrom. This arrangement has not proven satisfactory since the telescopic sections were designed to function in collisions of vehicles traveling at relatively high speeds and it has been found that many personal injuries occurred at a rate of speed below that for which the frame members were designed to telescope. Furthermore, it was found that the impact being absorbed by the telescoping frame members was transmitted directly to the vehicle body and to its occupants since the vehicle body remained connected to the chassis frame during collision also resulting in the vehicle occupants being in the path of the collision after the initial impact.

To overcome the above-noted disadvantages experienced in vehicles having telescopic frame assemblies, the chassis frame of the present invention has been devised which comprises, essentially, longitudinally extending, telescopic frame members having inclined portions formed on each end thereof; anti-friction rollers mounted on the inclined frame portions support similarly inclined frame portions secured to the vehicle body, and shear bolts connect the telescopic sections to each other and to the vehicle body.

By this construction and arrangement, in front or rear end collisions occurring at relatively slow speeds, the bolts connecting the vehicle body to the frame assembly shear thereby detaching the body from the frame whereby the detached vehicle body gradually travels up the respective inclined portions of the frame members. In front or rear end collisions occurring at relatively high speeds, the shear bolts connecting the frame members break, together with the shear bolts connecting the vehicle body to the frame members, whereby the frame members move to the telescoped position while the vehicle body becomes detached from the frame assembly thereby causing both ends of the vehicle body to simultaneously travel upwardly on the respective inclined portions of the frames.

By detaching the vehicle body from the frame assembly, the force of the impact is not transmitted to the occupants through the frame assembly and by causing the vehicle body to travel upwardly on the inclined portions of the frame assembly, the occupants of the vehicle are moved out of the direct path of the collision.

Figure 1:
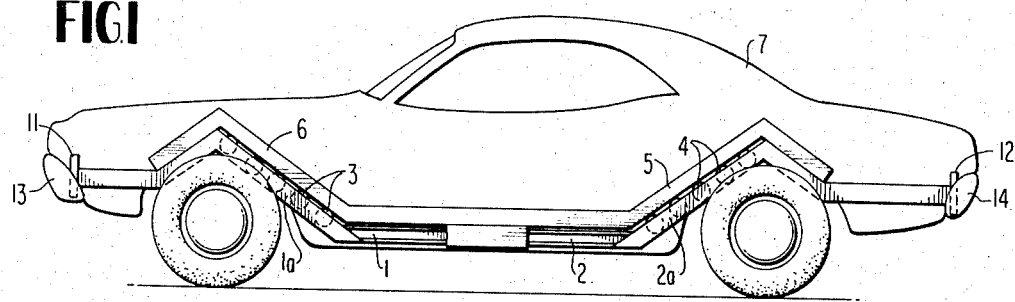
FIG. 1 is a side elevational view of the chassis frame of the present invention in the normal position.
Figure 2:
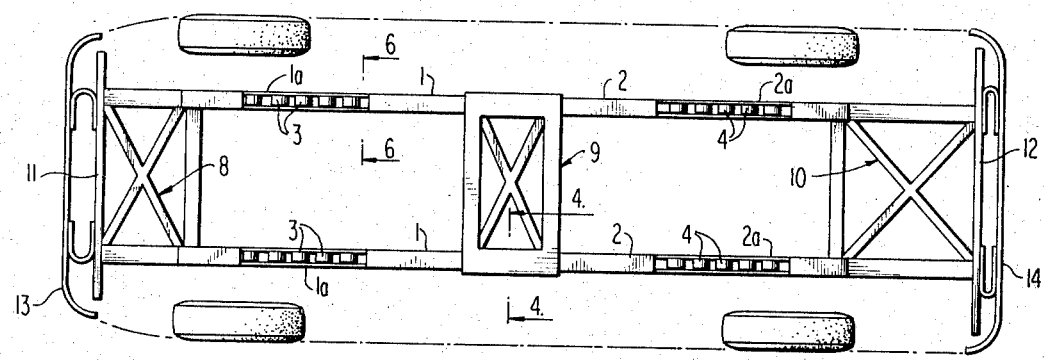
FIG. 2 is a bottom plan view of the frame.

Referring to the drawings, and more particularly to FIGS. 1 and 2, the vehicle chassis frame of the present invention comprises a pair of spaced, parallel, longitudinally extending frame members, each having a forwardly extending section 1 telescopically received within a rearwardly extending section 2. The end portions of the frame members are provided with inclined portions 1a and 2a, respectively, which carry anti-friction rollers 3 and 4. The rollers support similarly inclined frame members 5 and 6 secured to the vehicle body 7. The frame members are stabilized by transverse frame assemblies 8, 9 and 10 and the ends of the longitudinal frame members are provided with heavy duty bumpers 11 and 12 integrally connected thereto, the bumpers being provided with detachable ornamental covers 13 and 14.

Figure 6:
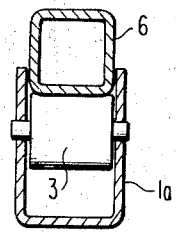
FIG. 6 is a view taken along line 6—6 of FIG. 2.
Figure 7:
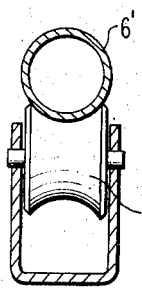
FIG. 7 is a sectional view similar to FIG. 6 but showing a modification of the roller assembly.
Figure 4:
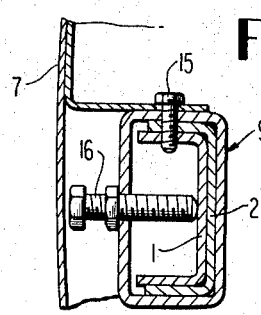
FIG. 4 is a view taken along line 4—4 of FIG. 2.
Figure 5:
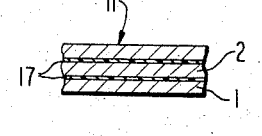
FIG. 5 is a fragmentary sectional view of the chassis frame members having an anti-friction coating therebetween.

As will be seen in FIG. 4, the portions of the longitudinal frame members which extend through the transverse frame assembly 9 are channel-shaped in cross-section and the vehicle body is secured thereto by shear bolts 15, the sections 1 and 2 being held in the telescoped position by set-bolts 16. If desired, an anti-friction coating 17 (FIG. 5), such as Teflon, may be provided on the opposed faces of the frame members 1, 2 and 9. As will be seen in FIG. 6, the inclined portions 1a of the longitudinal frame members are U-shaped in cross-section with the anti-friction rollers journaled therein, the inclined frame 6 secured to the vehicle body being tubular in cross-section. While the rollers shown in FIG. 6 are cylindrical to support the rectangular cross-section of tubular frame 6, the rollers could be hyperbolic for supporting a tubular frame of circular cross-section as shown in FIG. 7.

Figure 3:
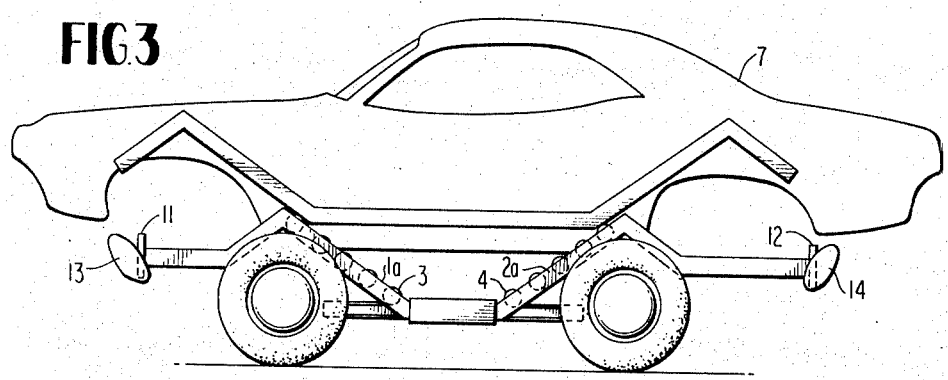
FIG. 3 is a side elevational view of the frame assembly in the telescoped position with the vehicle body detached therefrom.

In the operation of the chassis frame, in front end or rear end collisions at relatively high speeds, for instance, above 45 miles per hour, at initial impact the shear bolts 15 break, detaching the vehicle body 7 from the frame members, the force of the impact then causes the portion of the shear bolt 15 extending between the frame members to break while moving the sections 1 and 2 to the telescoped position. As the sections move to the telescoped position, as shown in FIG. 3, the vehicle body rides upwardly on the inclined portions thereby moving the passengers out of the path of the collision.

Figure 8:
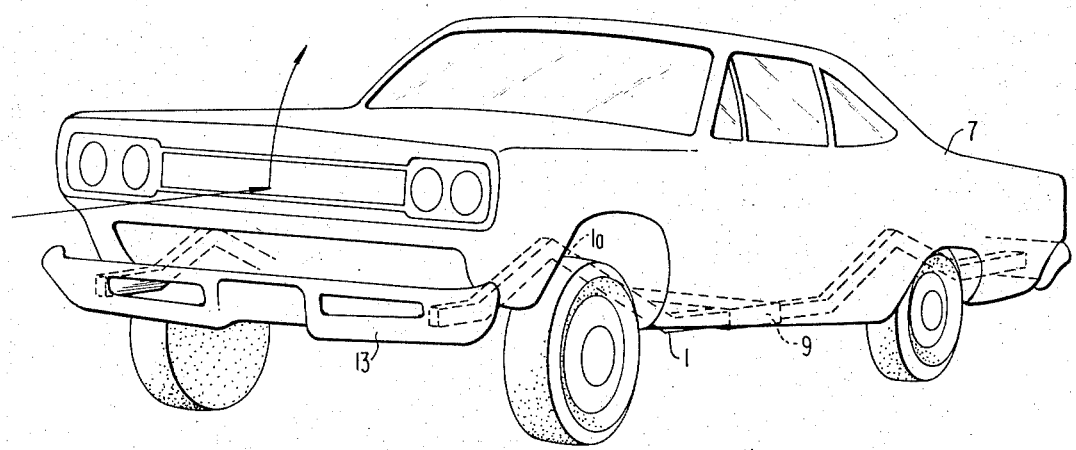
FIG. 8 is a perspective view of the chassis frame showing the vehicle body detached therefrom after a front end collision.
Figure 9:
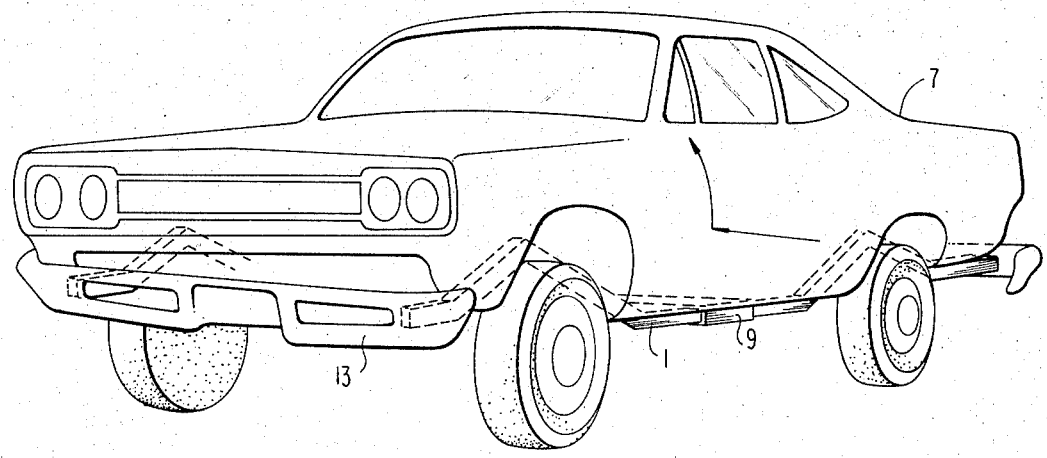
FIG. 9 is a perspective view of the chassis frame showing the vehicle body detached therefrom after a side collision.

In collisions at relatively low speeds for instance, below 45 miles per hour, there is no telescoping of the sections 1 and 2 but only a shearing of the bolts 15 to detach the vehicle body from the frame members. The positions of the vehicle body under these conditions are shown in FIG. 8, after a front end collision; and in FIG. 9, after a collision from the side of the vehicle. By detaching the vehicle body from the chassis frame, the force of the impact is transmitted to the chassis, including wheels, axles, engine, etc. so that in effect, the chassis and associated weight is driven from under the vehicle body thereby absorbing the collision force.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A vehicle chassis frame comprising a pair of spaced, parallel, longitudinally extending frame members, each frame member including telescopic sections, one section extending forwardly of the vehicle and the other section extending rearwardly of the vehicle, inclined portions formed on each end of said frame members, a vehicle body supported on said frame members, shear fastener means connecting said vehicle body to said frame members, said shear fastener means extending between said sections to hold the sections in the extended position, and inclined frame members mounted on said vehicle body, said inclined frame members supported on the inclined portions of said longitudinally extending frame members, whereby upon a collision of a predetermined magnitude the vehicle body becomes detached from the frame members, and upon a collision above the predetermined magnitude the shear fastener means break thereby detaching the vehicle body from the frame members while the sections move to the telescoped position thereby causing the vehicle body to travel upwardly on each of the inclined portions.

2. A vehicle chassis frame according to claim 1, wherein an anti-friction coating is provided on the opposed faces of the telescopic sections.

3. A vehicle chassis frame according to claim 1, wherein front and rear bumpers are integrally connected to the respective ends of the frame members, and ornamental covers detachably connected to said bumpers.

4. A vehicle chassis frame according to claim 1, wherein a transversely extending frame assembly is provided between the longitudinally extending frame members, the telescopic sections of the frame members extending through said frame assembly, said shear fastener means extending through said vehicle body, frame assembly and telescopic sections.

5. A vehicle chassis frame according to claim 4, wherein set-bolt means extend through said frame assembly and abut the telescopic sections to hold the sections in a predetermined extended position.

6. A vehicle chassis frame according to claim 1, wherein a plurality of anti-friction rollers are mounted in the inclined portions of the frame members, the inclined frame members on the vehicle body being supported on the rollers.

7. A vehicle chassis frame according to claim 6, wherein the anti-friction rollers are cylindrical and the inclined frame members of the vehicle body are tubular having a rectangular cross-section.

8. A vehicle chassis frame according to claim 6, wherein the anti-friction rollers are hyperbolic and the inclined frame members of the vehicle body are tubular having a circular cross-section.

* * * * *